United States Patent Office 3,519,008
Patented July 7, 1970

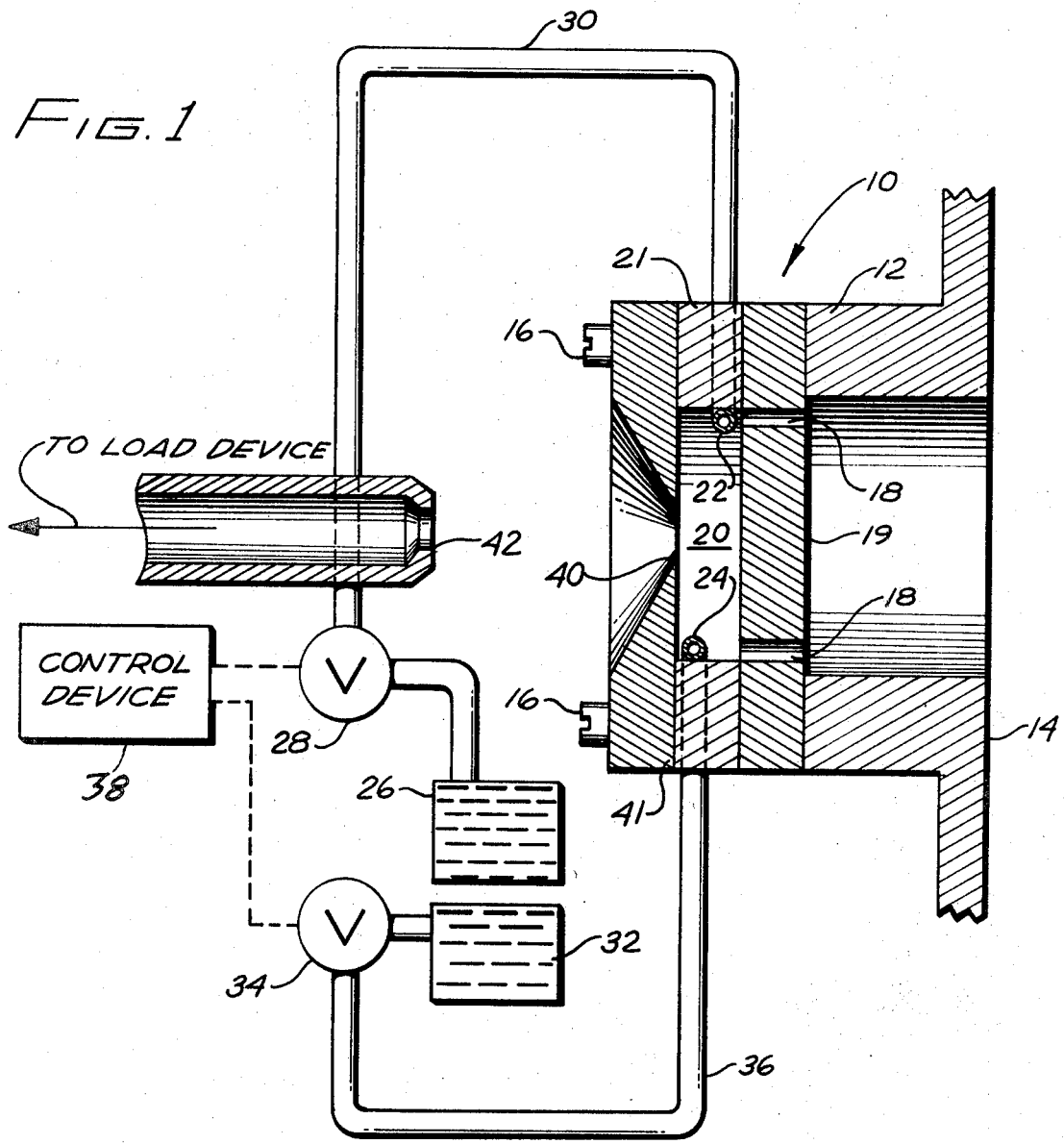

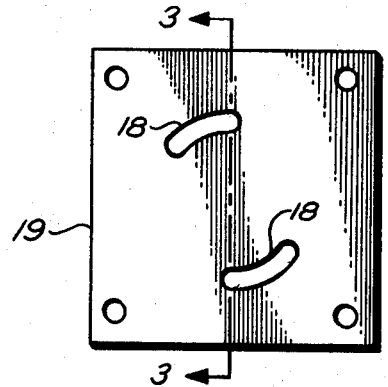
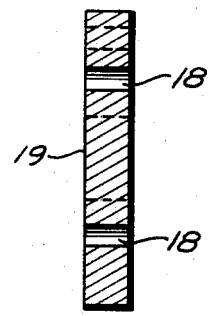
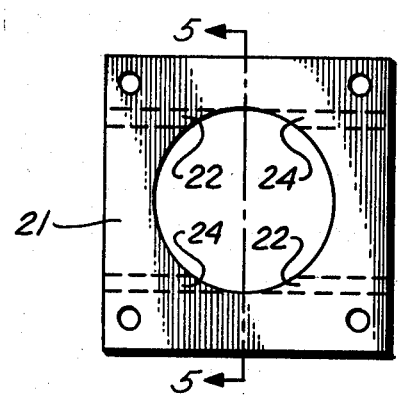
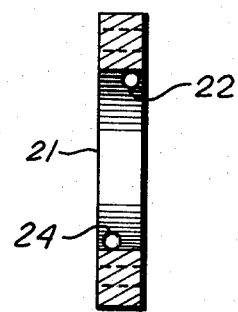
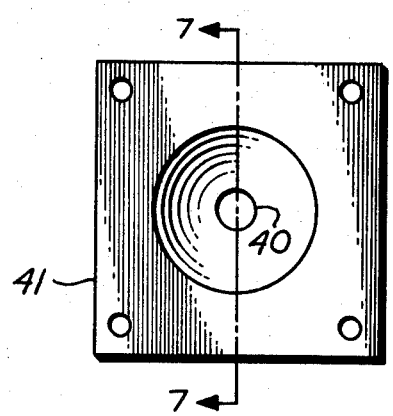

3,519,008
VORTEX VALVE ASSEMBLY
Vernon R. Fish, Orange, Calif., assignor to The Bendix Corporation, a corporation of Delaware
Filed Oct. 30, 1967, Ser. No. 679,080
Int. Cl. F15c 1/16
U.S. Cl. 137—81.5                                   6 Claims

ABSTRACT OF THE DISCLOSURE

A vortex valve of the type wherein flow therethrough is controlled by means of a control fluid injected under variable pressures tangentially to produce a vortex flow in an internal cylindrical chamber, the assembly consisting essentially of three axially aligned plates. The first plate is in contact with a source of supply fluid under pressure and includes a plurality of ports of limited area arranged generally along the circumference of a circle; the second includes a large cylindrical port whose circumference is in registry with the ports and whose axis and walls are the axis and edge walls of the vortex chamber, and one or more control ports intersecting the cylindrical port at its periphery connected with the control fluid source; and a third plate has an orifice in axial alignment with said cylindrical port, the area of the orifice being substantially less than the area of the ports in the first plate, the orifice being tapered radially outwardly.

BACKGROUND OF THE INVENTION

This invention pertains to vortex valves of the type known in the art wherein the valve is connected to a source of fluid under pressure (either gas or liquid) and a smaller fluid flow is used to control flow from the source through the valve. This is typically accomplished by providing a chamber within the valve of circular cross-section, and the control fluid is applied tangentially to cause the flow in said chamber to be directed circumferentially with a corresponding diminution in the flow from the outlet orifice. The assembly described is of this type and operates in the same manner. The typical prior art vortex valve, however, is somewhat expensive to build because the usual structure has involved forming an inside member and an outside member, both with ports and passages, the outside member cooperating with the inside member to form the vortex chamber. Frequently intricate machining is involved, and the valve becomes expensive because of the amount of fabrication time required.

SUMMARY

The present invention is directed to a vortex valve assembly which is quite starightforward and comparatively inexpensive to produce. Tolerances are reasonable, and all of the machining operations are simple and straightforward. The basic assembly consists of a series of three plates of some thickness which are stacked to produce a complete vortex valve. The center plate has a large port cut through its center such that it and the other plates define the cylindrical wall and the top and bottom, respectively, of the cylindrical vortex chamber. The center plate also contains ports for directing control fluid tangentially into the cylindrical chamber to cause the vortex flow pattern. The supply plate on the supply side includes a plurality of orifices arranged to direct inlet fluid flow into the vortex chamber near its periphery, and the outlet plate includes the outlet orifice which is smaller in effective area than the total inlet orifice area. By manufacturing these three plates separately, all of the surfaces in which ports and orifices are to be formed are completely exposed, and no problems are presented by the need to form or remove metal from interior surfaces or other relatively inaccessible locations.

DESCRIPTION OF THE DRAWINGS

FIG. 1 is a schematic view, with parts shown in section, of a vortex valve made according to my invention in association with sources of supply and control fluid.

FIG. 2 shows a plan view of the supply plate of my assembly.

FIG. 3 shows a sectional view through the plate 2 taken along line 3—3 of FIG. 2.

FIG. 4 shows a plan view of the chamber plate of my assembly.

FIG. 5 shows a sectional view through the plate 4 taken along line 5—5 of FIG. 4.

FIG. 6 is a plan view of the outlet orifice plate of my assembly; and

FIG. 7 is a sectional view through the plate 6 taken along line 7—7 of FIG. 6.

DESCRIPTION OF THE PREFERRED EMBODIMENT

Referring now to FIG. 1, my vortex valve is shown generally at numeral 10. It is fastened to a boss 12 extending from an opening in a bulkhead 14 by any suitable means, such as a plurality of mounting bolts 16. Bulkhead 14 may be part of any pressure vessel or source of fluid under pressure. Flow from the high pressure fluid source behind bulkhead 14 is communicated through the opening surrounded by boss 12 to a plurality of inlet ports 18 in a plate 19 which are generally arranged along the circumference of a circle. Flow through ports 18 enters a vortex chamber 20 which is in the general configuration of a flat cylinder, directly adjacent its circumferential edge or periphery. Intersecting with the periphery of chamber 20 in the chamber plate 21 in such manner as to direct flow tangentially into the chamber are one or more control fluid ports 22, 24. These control fluid ports connect with one or more sources of control fluid under pressure such as that shown in a pressure tank 26. This pressure tank 26 is shown in communication with a valve 28 and a conduit 30 terminating at port 22. Conventionally, flow from port 24 would operate in the opposing direction to that from port 22, and this port would be supplied from a high pressure source such as tank 32 through a valve 34 and a conduit 36. Valves 28 and 34 may be operated in response to changes in any desired operating conditions by means of a control device 38.

The outlet from vortex valve 10 is by means of an orifice 40 in an outlet plate 41 which is effectively centered along the axis of chamber 20. Orifice 40 is typically much smaller in diameter than the total diameter of chamber 20. Depending upon whether the working fluid is a liquid or a gas, the total area of the chamber 20 may typically be about four to six times the outlet orifice diameter. To minimize pressure losses, the outlet orifice is tapered radially outwardly, as shown.

In some instances, it may be desired to use the vortex valve as an amplifier. In such case a pressure pickup 42 is placed in direct alignment with the outlet orifice 40. The fluid pressure sensed at pickup 42 may be used to operate a load device such as an actuating piston in a hydraulic motor or an intermediate control device such as a spool valve.

The device described operates in a manner conventional with vortex valves. The supply fluid under pressure enters inlet ports 18 and, hence, the vortex chamber 20 adjacent its periphery. In the absence of a control fluid input at ports 22 and/or 24, the fluid pressure builds up in chamber 20 because the area of outlet orifice 40 is substantially smaller than the inlet port area. When control fluid is supplied from port 22 at a pressure higher than the pressure in chamber 20, this high pressure tangential flow causes the fluid in chamber 20 to spin rapidly in a wheel-like manner. With increasing speed circumferentially, the axial component available to cause flow out of orifice 40 becomes less and less, and the outlet flow diminishes until it is effectively stopped altogether. It sometimes occurs that the circumferential flow reaches such a velocity that partial vacuum is produced at the axis of the vortex chamber inside the outlet port 40, and it may begin to force control fluid in the reverse direction with the results that ports 18 become outlet ports, exhausting flow into the inlet pressure source despite the pressure level encountered. With the arrangement thus far described, the flow from within the source behind bulkhead 14 through the vortex valve 10 may be controlled or modulated between a maximum value and zero (or even reverse flow) by controlling the pressure of the control fluid from port 22. This pressure may be controlled by adjusting valve 28 as desired by any suitable means such as by control device 38. Valve 28 might also be controlled manually.

The port 24 also provides for tangential flow of a control fluid in a manner analogous to that of port 22, but the flow is in the opposite direction. Hence flow from port 24 may be used to reduce the effect of flow from port 22 and vice versa. The control device 38 may respond to a plurality of input condition sensors, and if one of the conditions sensed calls for greater flow from outlet orifice 40 at a time when another calls for less, the arrangement shown provides a means for subtracting the effects of these inputs.

The details of my stacked vortex valve assembly may become more apparent from consideration of FIGS. 2–7. FIG. 2 is a plan view of the supply plate 19 including the inlet passages 18. These passages may consist of a series of drilled holes or slots arranged along the cirmumference of a circle corresponding with the periphery of the vortex chamber 20. FIG. 3 is a sectional view taken along line 3—3 of FIG. 2 and shows ports 18 cut through. FIG. 4 is a plan view of the chamber plate 21 showing the large centrally-disposed port which defines the circumferential edges of the chamber 20, as well as the control ports 22 and 24. Two of each of ports 22 and 24 are shown in dotted outline; however, any convenient number could be used, depending upon space and requirements. FIG. 5 is a sectional view of the chamber plate 21 taken along line 5—5 of FIG. 4. This view shows the ports 22 and 24 which intersect with the vortex chamber 20. FIGS. 6 and 7 are not such as to require such thickness. Plate 21 must be of such thickness as to provide an adequate volume for chamber 20, and it must also accommodate the drilled passageways to ports 22 and 24. If plate 21 were made too thin, the ratio of diameter to height of the chamber 20 becomes too great, and surface friction along the walls of the chamber would inhibit the desired circumferential motion of the fluid. The plates 19, 21 and 41 are shown square, and this is convenient because the corners provide locations for the mounting bolts 16, but any desired shape may be used. It is also recognized that this valve structure, or several such valves, may be used in a single hydraulic or fluidic control, in which case each of the plates shown may contain a number of other passages for other purposes, or the plates may be part of a more complex member such as a casting, or a number of sets of the same passages shown in one plate may be formed on a single plate.

I claim:
1. A vortex valve assembly for connection with a source of supply fluid under pressure and a source of control fluid under a variable inlet pressure, said assembly comprising
   a first plate connected to said source including a plurality of ports of limited area which permits flow through said plate,
   a second plate adjacent said first plate having a cylindrical port therethrough with the periphery of said port in alignment with the ports in said first plate, and a control port intersecting said cylindrical port at its periphery and connected with said source of control fluid,
   a third plate adjacent said second plate having an orifice therethrough whose axis is substantially aligned with the axis of said cylindrical port and whose diameter is substantially smaller then the diameter of the cylindrical port in said second plate, and
   fastening means holding said plates in axial alignment.
2. A vortex valve assembly as set forth in claim 1 wherein said orifice in said third plate tapers radially outwardly toward the outside edge of said third plate.
3. A vortex valve assembly as set forth in claim 1 wherein a pressure recovery device is positioned in substantial axial alignment with the flow from said orifice in said third plate.
4. A vortex valve assembly as set forth in claim 1 wherein said second plate includes a plurality of control ports intersecting said cylindrical port at its periphery.
5. A vortex valve assembly as set forth in claim 4 wherein said control ports are arranged such that flow from some of said control ports is directed oppositely to flow from other of said control ports.
6. A vortex valve assembly for connection with a source of supply fluid under pressure and a source of control fluid under a variable input pressure to vary the flow from said vortex valve in response to changes in the control fluid input pressure, said assembly comprising
   a supply plate connected with said source including a plurality of ports of limited area which permit flow through said plates in a direction essentially perpendiiular to the plane of said plate,
   a chamber plate immediately adjacent said supply plate having a large cylindrical port therethrough with said ports in said supply plate being aligned with the periphery of said cylindrical port and a control port connected to said source of variable fluid pressure and aligned within said chamber plate to direct control fluid flow substantially tangentially with respect to said cylindrical port and perpendicularly with respect to the direction of flow through said supply plate,
   an outlet orifice plate immediately adjacent said chamber plate on the opposite side from said supply plate, said orifice plate having an orifice therethrough whose axis is essentially aligned with the axis of said large cylindrical port, said orifice being substantially smaller in diameter than the diameter of said large cylindrical port and tapering radially outwardly toward the outside edge thereof, and
   fastening means holding said plates in axial alignment.

References Cited

UNITED STATES PATENTS

| | | | |
|---|---|---|---|
| 3,219,048 | 11/1965 | Palmisano | 137—81.5 |
| 3,267,946 | 8/1966 | Adams et al. | 137—81.5 |
| 3,272,213 | 9/1966 | Jones | 137—81.5 |
| 3,290,947 | 12/1966 | Reilly | 137—81.5 XR |
| 3,324,891 | 6/1967 | Rhoades | 137—81.5 XR |
| 3,373,759 | 3/1968 | Adams | 137—81.5 |
| 3,413,995 | 12/1968 | Bowles et al. | 137—81.5 |

SAMUEL SCOTT, Primary Examiner